United States Patent Office 2,892,728
Patented June 30, 1959

2,892,728

CEMENT COMPOSITION

Eugene R. Jolly, Montebello, Calif.

No Drawing. Application April 24, 1956
Serial No. 580,165

7 Claims. (Cl. 106—97)

This invention relates to a cement composition and more particularly to concrete and to hydraulic binding agents, gypsum, hydraulic cement and to the hardening and waterproofing of the concretes or mortars made therefrom, whereby the various desirable qualities of these products and mixtures are greatly improved, particularly the strength, hardness, and other properties.

One of the important objects of this invention relates to the introduction into the cement of additives or some other agents, which, when properly controlled, will reduce the amount of gauging water without adversely affecting the plasticity or other physical properties of the resultant mixture and which will further provide a substantial increase in the strength of the final product.

Another important object of this invention is to provide a treatment for cement, whereby the ratio of water to the Portland cement is so reduced that while required fluidity still results, the concrete can be easily worked and deposited in forms.

A further object of the invention is to provide a plasticizing agent or additive for concrete and the like, wherein the final product will shrink less in hardening and which when hardened is denser and less permeable.

It is well known that the process of making concrete can be influenced by additives which improve the plasticity or workability of the mix. Some of these additives include albumen or decomposition products thereof, various condensation products of naphthalene sulfonic acid, salts of lignin sulfonic acid, hydroxylated carboxylic acid compounds and others, used separately or in combination.

However, it has been found that while such agents are capable of reducing the water to cement ratio for a given plasticity, they do in many cases and at the same time, adversely affect other physical properties of the mix, whereby the final hardened concrete does not exhibit such an improvement as could be expected or which can be considered as in keeping with the amount of water saved.

It has been found that many of these agents or additives which are variously called dispersing agents or fluidity increasing materials, may so adversely affect other properties of the final concrete, that it is of distinct inferior quality.

One such condition occurs where the fluidity increasing agent has the property of reducing the surface tension of the gauging water, wherein a foam or froth is created in the mix during the mixing period. The volume of air so introduced may be less, equal, or greater than the volume of replaced water, but in any case this reduction in water to cement ratio is accompanied by simultaneous reduction in density, which is not in keeping with results such as would be expected from the reduction in net gauging water.

In other instances, the use of such agents is accompanied by an undue lengthening of the setting process or by some other chemical reaction, wherein a hardened concrete or mortar results with little or no improvement in eventual final desirable qualities.

According to this invention, the undesirable results and above described difficulties, may be overcome and a hardened concrete with improved qualities can be provided by introduction into the cement, concrete, mortar or similar hydraulic binding agents, any of a group of relatively high molecular weight phosphate polymers, such as sodium tripoly-phosphate, sodium hexameta phosphate, sodium tetraphosphate or the like. These agents may be employed either in a liquid or powder form and they may be combined and their various uses improved by the additions of other organic and inorganic compounds.

The additive of this invention may be incorporated into the cement clinker itself and inter-ground therewith at the time of manufacture. However, it can also be incorporated at other times up to and including the actual final mixing of the water and other ingredients.

One example of the use of polyphosphate products as distinguished from other water reducing agents, comprises a mixture of one part hydraulic cement to three parts of sand by weight, made up to a plastic workable consistency and with a variable amount of net gauging water is illustrated in the following table.

| Water Reducing Agent | Water Cement Ratio, gals./sack | Density, lbs. cu. ft. | Compressive Strength, 28 Days, p.s.i. |
|---|---|---|---|
| None, Plain Mortar | 6.8 | 134.8 | 2,700 |
| Calcium salt of Naphthalene sulfonic acid condensation product (.25% by wt.) | 6.0 | 134.4 | 2,575 |
| Alkyl-Aryl sodium sulfonate dispersing agent (.2% by wt.) | 6.0 | 136.5 | 2,950 |
| Sodium Tetraphosphate (.25% by wt. of cement) | 6.0 | 137.5 | 4,895 |

It will be apparent from the above, that while a water reduction is obtained by the use of sulfonates, no particular improvement in compressive strength is obtained, but the use of sodium tetraphosphate almost doubles the final pounds per square inch strength.

Another test wherein two mixtures each of 94 pounds of hydraulic cement to 282 pounds of washed concrete sand were made up, one with and the other without the addition of the polyphosphate and water to equal plastic consistencies, it was found that after twenty-eight days of total immersion in water, the standard 2" x 4" test cylinders gave the following average strength:

P.s.i.
No addition _____ 4540
Polyphosphate, .2 lb. per 94 lbs. cement _____ 6280

In another experiment, a concrete consisting of hydraulic cement sand and gravel was so proportioned that the cement content was 5.4 sacks per cubic yard of concrete. Various additions were then made providing final concretes having ultimate physical properties noted as follows:

| | Mix I | Mix II | Mix III |
|---|---|---|---|
| Water/cement ratio, gal./sack | 7.85 | 7.62 | 6.88 |
| Consistency, measured by standard 12" slump cone, inches | 4¼ | 6½ | 6½ |
| Total Air content, percent | 1.1 | 1.2 | 4.3 |
| 7 Day Strength, average p. s. i. | 1,810 | 2,395 | 2,235 |
| 28 Day Strength, average p. s. i. | 3,271 | 4,035 | 3,448 |
| Additive | None | (¹) | (²) |
| Amount by wt. of cement, percent | | .25 | .25 |

¹ Polyphosphate.
² De-sugared Calcium lignin sulfonate.

Another experimental test showed interesting results as follows:

|  | MIX I | MIX II | MIX III |
| --- | --- | --- | --- |
| Water/cement ratio, gal./sack | 7.25 | 6.85 | 6.35 |
| Consistency, measured by standard 12" slump cone, inches | 4½ | 4½ | 4½ |
| Total Air Content, percent | 1.2 | 1.2 | 4.5 |
| Additive | None | (¹) | (²) |
| Amount by weight of cement, percent |  | .12 | .25 |
| 7 Day Strength, average p.s.i. | 2,125 | 2,950 | 2,260 |

¹ Polyphosphate.
² Sugar-free calcium lignin sulfonate made by the calcium precipitation process.

The above examples serve to further illustrate the fact that while other known agents are able to make reductions in the water-cement ratio, and some improvement in strength, they are in no way as effective as the polyphosphate compounds where the density, air content, and other physical properties of the mix are at the same time changed by their use.

The favorable improvement in properties which result from the treatment of hydraulic cement, mortars and concretes by the higher molecular weight polymerized phosphate compounds may be further modified and improved by the addition of mineral oils, higher molecular weight vegetable protein split-off products, accelerators, and pozzolanic materials, without thereby adversely affecting the other favorable results obtained by the use of the polymerized phosphates.

By way of illustration of the method of treatment of the phosphate polymers in combination with the above mentioned materials, I may use the following procedure: 1 part by volume of refined mineral oil together with a lyophilic emulsifier is mixed with 1 to 4 parts of a 20% solution of polyphosphate in water, adding the water phase to the oil phase with agitation. The resultant creamy emulsion is then added in a manner so that the polyphosphate is always .05% to 2% by weight of the cement. A mortar or concrete having superior qualities in resisting water absorption, strength, and plasticity results.

It is sometimes desirable to entrain 4% to 6% air into the wet mix concrete in order to improve frost resistance, resistance to freezing and thawing or in cases where a natural heavy aggregate sand is blended with a lightweight pumice aggregate or expanded shale aggregate resulting in a lightweight concrete. By way of illustration, I may use the following procedure: A hydrolyzed vegetable protein solution is prepared by digesting 200 pounds of cottonseed meal, 1600 pounds of water and 30 pounds of lime for four hours at 90° C. The solution is filtered, neutralized with hydrochloric acid and 2½ ounces of this solution are mixed with 13½ ounces of a 20% solution of polyphosphate in water. The resulting solution is added to hydraulic cement mortars or concretes in such proportion that the polyphosphate is always .05 to 2% by weight of cement.

Various accelerators or retarders may be employed in connection with any of the above described formulae in order to meet varying requirements and in connection with special circumstances. The material of this invention may replace all or part of the gypsum mixed with the Portland cement at the time of manufacture for controlling setting time.

The method described minimizes the water to cement ratio while at the same time increasing the final strength of the concrete mortar or similar material.

It will be understood by those skilled in the art that this invention in its broad features is not restricted to the ingredients, methods or proportions herein referred to by way of illustration and that further modifications and methods of treatment are within the scope of this application, except as noted within the appended claims.

I claim as my invention:

1. A concrete or mortar composition consisting essentially of Portland cement, gauging water for said cement, aggregate in a major proportion with respect to said cement, and a minor proportion of an inorganic, water-soluble phosphate polymer, said polymer being effective to increase the compressive strength of the composition in the set condition.

2. A concrete or mortar composition consisting essentially of Portland cement, gauging water for said cement, aggregate in a major proportion with respect to said cement, and from 0.01 to 2%, based upon the weight of said cement, of an inorganic, water-soluble phosphate polymer, said polymer being effective to increase the compressive strength of the composition in the set condition.

3. A concrete or mortar composition consisting essentially of Portland cement, gauging water for said cement, aggregate in a major proportion with respect to said cement, and a minor proportion of sodium tetraphosphate effective to increase the compressive strength of the composition in the set condition.

4. A concrete or mortar composition consisting essentially of Portland cement, gauging water for said cement, aggregate in a major proportion with respect to said cement, and from 0.01 to 2%, based on the weight of said cement, of sodium tetraphosphate effective to increase the compressive strength of the composition in the set condition.

5. A concrete or mortar composition consisting essentially of Portland cement, gauging water for said cement, aggregate in a major proportion with respect to said cement, and a minor proportion of sodium tripolyphosphate effective to increase the compressive strength of the composition in the set condition.

6. A concrete or mortar composition consisting essentially of Portland cement, gauging water for said cement, aggregate in a major proportion with respect to said cement, and a minor proportion of sodium hexametaphosphate effective to increase the compressive strength of the composition in the set condition.

7. A structural material consisting essentially of hydrated Portland cement, aggregate in a major proportion with respect to said cement, and a minor proportion of an inorganic water-soluble phosphate polymer effective to increase the compressive strength of the material in the set condition.

References Cited in the file of this patent

UNITED STATES PATENTS

| | | |
| --- | --- | --- |
| 1,710,921 | Cross | Apr. 30, 1929 |
| 1,772,999 | King | Aug. 12, 1930 |
| 2,019,666 | Fiske | Nov. 5, 1935 |
| 2,025,503 | Fiske | Dec. 24, 1935 |
| 2,133,286 | Fiske | Oct. 18, 1938 |
| 2,191,555 | Berliner | Feb. 27, 1940 |
| 2,215,812 | Kaplan | Sept. 24, 1940 |
| 2,233,973 | Dunn | Mar. 4, 1941 |
| 2,322,194 | King | June 15, 1943 |
| 2,629,667 | Kaveler | Feb. 24, 1953 |
| 2,646,360 | Lea | July 21, 1953 |
| 2,702,753 | Dickey | Feb. 22, 1955 |

FOREIGN PATENTS

| | | |
| --- | --- | --- |
| 737,551 | Great Britain | Sept. 28, 1955 |